N. CLOUETTE.
DRIVING DEVICE FOR PNEUMATIC DUST REMOVERS.
APPLICATION FILED MAR. 3, 1913.
1,154,379. Patented Sept. 21, 1915.
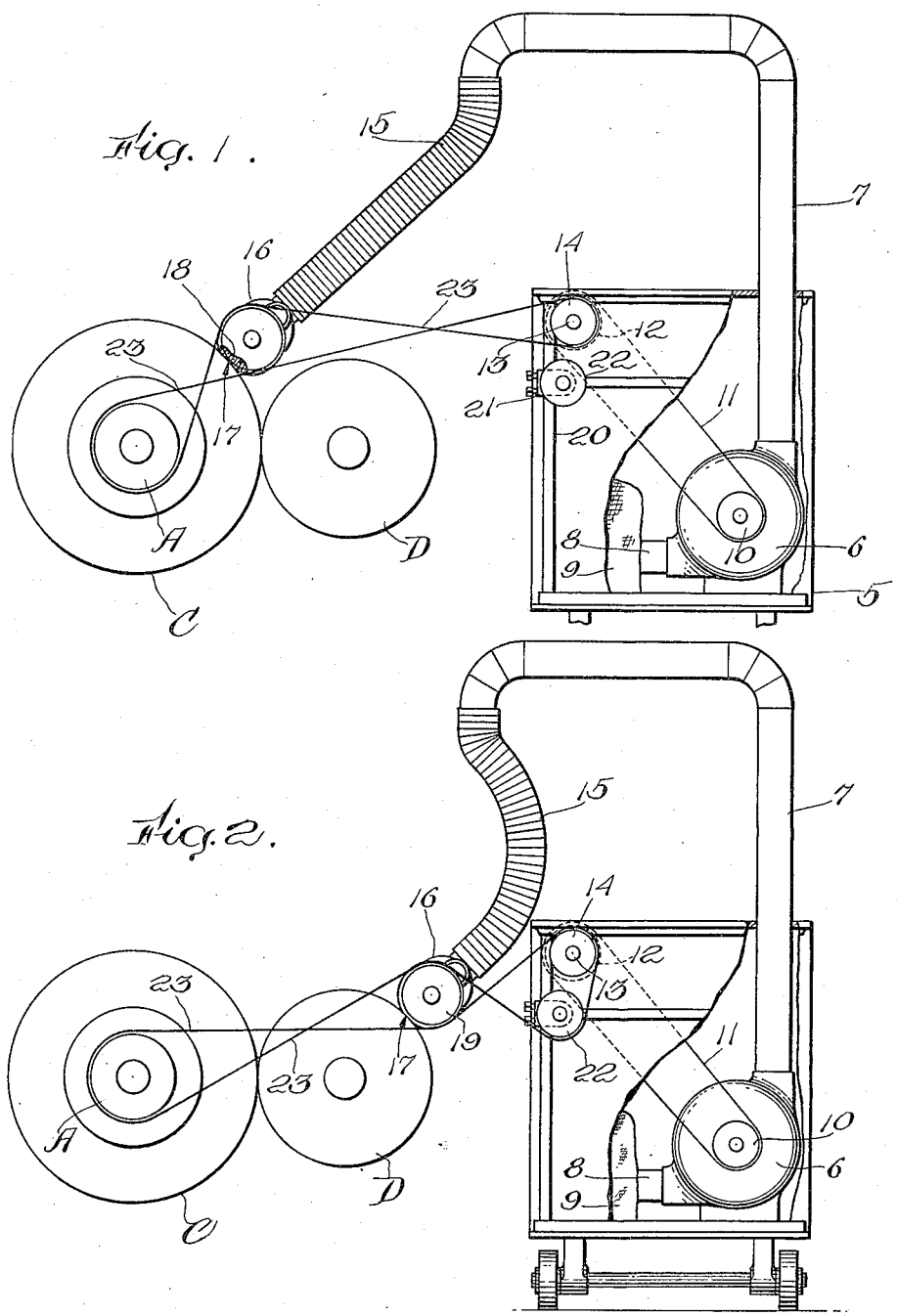

UNITED STATES PATENT OFFICE.

NELSON CLOUETTE, OF PENACOOK, NEW HAMPSHIRE, ASSIGNOR TO WILLIAM FIRTH, OF CHESTNUT HILL, MASSACHUSETTS.

DRIVING DEVICE FOR PNEUMATIC DUST-REMOVERS.

1,154,379.   Specification of Letters Patent.   Patented Sept. 21, 1915.

Application filed March 3, 1913. Serial No. 751,708.

*To all whom it may concern:*

Be it known that I, NELSON CLOUETTE, of Penacook, in the county of Merrimack and State of New Hampshire, have invented certain new and useful Improvements in Driving Devices for Pneumatic Dust-Removers, of which the following is a specification, reference being had to the accompanying drawings, forming part thereof.

This invention has reference to improvements in driving devices for pneumatic dust removers primarily adapted for use to draw dust from the cylinders of carding engines during the operation of stripping or grinding said cylinders.

The main object of this invention is to so construct a driving device of this nature adapted to be driven from the machine operated upon, that by the use of a single belt the stripper brush and the pneumatic dust collector may be operated relative both to the main carding cylinder and to the doffer cylinder.

Other objects of the invention will appear from the following description.

The invention consists in the novel unitary device for both the carding cylinder and the doffing cylinder.

The invention also consists in such other novel features of construction and combination of parts as shall hereinafter be more fully described and pointed out in the claim.

Figure 1, represents an end elevation of a pneumatic dust remover, of the nature herein referred to, provided with my improved driving device which is shown as operated from the shaft of the main or card cylinder the periphery of which cylinder is under operation of the stripper and dust collector mouth piece; the carriage of the machine being broken away to show some of its parts. Fig. 2, represents a similar view showing the stripper mouth piece positioned relative to the doffer cylinder and the drive belt arranged for operating the stripper and the pneumatic apparatus.

Similar reference characters designate corresponding parts throughout.

As shown in the drawings C and D represent respectively the main or carding cylinder and the doffer or doffer cylinder of any one of a series of carding engines to be operated upon for the purpose of stripping said cylinders and removing or collecting the dust occasioned by such stripping operation.

A indicates the pulley of the cylinder C.

The carriage 5 is constructed to travel so that it may be moved from one machine or carding engine to another and said carriage is provided with the pump casing 6 having the receiving pipe 7 and the delivery pipe 8 which latter communicates with the bag or other suitable dust receptacle 9. The rotary pump member of said casing 6 has the pulley 10 which is driven by the belt 11 from pulley 12 of the shaft 13 journaled in bearings near the upper portion of said carriage 5, said shaft 13 having at its ends belt pulleys as 14. The inlet pipe 7 extends above the carriage 5 and has the flexible pipe extension 15 which terminates in the mouth piece 16 adapted to be placed with its opening 17 close to the periphery of a cylinder and having rotatably mounted therein the stripping brush 18 the ends of the shaft of which have pulleys as 19. At the ends of the carriage 5 are mounted rods as 20 on which are slidably adjustable bearing members as 21 having rotatable idle take up pulleys as 22.

Belts as 23 are mounted on the peripheries of the main cylinder pulleys as A, and with the pulleys as 14 of shaft 13, the reaches of these belts are crossed and between these crossed portions of said belts are placed the pulleys as 19 of the stripping brush shaft. In such arrangement the stripper brush 18 is applied to the periphery of the main cylinder C and the rotation of said cylinder and its pulleys effects the operation of the stripper brush 18 through said belt 23 while, at the same time, shaft 13 is driven by said belt operating on pulleys as 14 and the fan element of pump casing 6 is caused to operate to draw dust from the point of the stripping operation through mouth piece 16 and pipes 15 and 7 to said casing 6 whence the dust is delivered to the receptacle 9. When the operation of the stripper is completed it is brought toward the carriage 5 and positioned adjacent the periphery of the doffer cylinder D and the slack portions of the belts as 23 are carried from the pulleys as 14 around the idle pulleys as 22 whereupon the stripper brush and the fan are operated relative to said doffer cylinder. After the operation of the stripper and dust remover on the carding and the doffing cylinders of one machine has been completed the mouth piece 16 is placed on carriage 5, the belts as 23 are disengaged from pulleys as A and said carriage 5 is moved to position adjacent another carding engine or similar machine and the process is repeated.

Having thus described my invention I claim as new and desire to secure by Letters Patent—

Apparatus of the class described comprising a carriage, a drive pulley thereon, a belt on said drive pulley adapted to be driven from the machine under operation, the reaches of said belt being crossed, and a rotary stripping brush having a pulley located between the crossed reaches of said belt whereby said pulley may be moved toward and from said drive pulley on said carriage while remaining in driving engagement with said belt.

NELSON CLOUETTE.

Witnesses:
HORACE B. SHERBURNE,
RALPH H. SHERBURNE.